United States Patent [19]
Hall

[11] Patent Number: 5,452,142
[45] Date of Patent: Sep. 19, 1995

[54] APPROACH FOR POSITIONING, FABRICATING, ALIGNING AND TESTING GRAZING, CONVEX, HYPERBOLIC MIRRORS

[75] Inventor: Howard D. Hall, Newtown, Conn.

[73] Assignee: Hughes Aircraft Company, Los Angeles, Calif.

[21] Appl. No.: 963,614

[22] Filed: Oct. 20, 1992

[51] Int. Cl.⁶ .......................... G02B 5/10; G02B 7/198
[52] U.S. Cl. ..................... 359/876; 359/853; 359/867; 359/869; 359/871; 359/900; 248/469
[58] Field of Search ............... 359/851, 853, 867, 876, 359/877, 900, 868, 869; 378/44, 70, 43; 248/176, 469, 473, 475.1, 476

[56] References Cited

U.S. PATENT DOCUMENTS

| | | | |
|---|---|---|---|
| 3,821,556 | 6/1974 | Hoover | 378/43 |
| 4,063,088 | 12/1977 | Dailey | 378/43 |
| 4,655,555 | 4/1987 | Mächler et al. | 359/858 |

Primary Examiner—Paul M. Dzierzynski
Assistant Examiner—Darryl J. Collins
Attorney, Agent, or Firm—W. C. Schubert; W. K. Denson-Low

[57] ABSTRACT

A convex, hyperbolic mirror (70) has a concave depression (72) made in a truncated apex end of the mirror. Such a depression may be used for aligning the mirror with respect to a Hindle sphere (74) or a primary mirror (86) in an optical system. An additional depression may be placed in an opposite end of the mirror and used together with the first depression to position the mirror with respect to an axis of rotation thereof to facilitate machining (66) of the mirror or testing (68). Tooling balls (52, 54) may be placed in the depressions and gas passages may be provided in the tooling balls for forming a gas bearing between the depressions and the tooling balls.

18 Claims, 5 Drawing Sheets

APPROACH FOR POSITIONING, FABRICATING, ALIGNING AND TESTING GRAZING, CONVEX, HYPERBOLIC MIRRORS

TECHNICAL FIELD

The present invention generally relates to grazing, convex hyperbolic mirrors and, more particularly, to the positioning, fabrication, alignment and testing thereof.

BACKGROUND OF THE INVENTION

Testing of convex hyperbolic mirrors using a concave, spherical mirror was suggested by Hindle and has been in common use for a number of years. A point source is placed at one conjugate of the hyperbola and the center of curvature of the concave spherical mirror (Hindle Sphere) is placed at its second conjugate. The combination of the two mirrors produces an image of the point source back upon itself. The image can be analyzed using a variety of techniques, including interferometry, and the knife edge in the manner suggested by Foucault.

SUMMARY OF THE INVENTION

An object of the present invention is to provide a process that defines one conjugate of a convex hyperbolic mirror.

Another object of the present invention is to facilitate the fabrication of a convex hyperbolic mirror.

Still another object of the present invention is to facilitate the testing of a convex hyperbolic mirror.

A further object of the present invention is to provide a process that facilitates alignment of a convex hyperbolic mirror in an optical system.

According to the present invention, a method of positioning a grazing, convex, hyperbolic mirror is provided wherein concave depressions are formed in opposite ends of the mirror, and the mirror is mounted between fixed points coincident with centers of curvature of the depressions for defining an axis of rotation of the mirror.

In further accord with the present invention, the mirror is rotated about the axis of rotation formed by the centers of curvature of the depressions, and the mirror is machined into a selected hyperbolic shape such that the axis of rotation is coincident with the major axis of the selected hyperbolic shape.

In still further accord with the present invention, a hyperbolic mirror mounted as described above may be rotated about the axis of rotation and tested for symmetry of its hyperbolic shape.

In further accord with the present invention, the fixed points may be tooling balls modified to provide a gas bearing between the depressions and the tooling balls.

Still further in accord with the present invention, one of the concave depressions has its center of curvature coincident with a focus of the mirror that is closer to the mirror than the other.

According to a second aspect of the present invention, a grazing, convex, hyperbolic mirror may be aligned with respect to a Hindle sphere by aligning a center of curvature of a concave depression in a truncated apex end of the mirror so as to be coincident with a focus of the mirror that is closer to the mirror than its conjugate and aligning the coincident center of curvature of the depression and the closer focus of the mirror to be coincident with a center of curvature of the Hindle sphere.

In further accord with the second aspect of the present invention, a point source may be provided at a focus of the mirror that is further from the mirror than the closer focus, and light may be sensed at the coincident center of curvature of the Hindle sphere, center of curvature of the depression and closer focus of the mirror.

In still further accord with the second aspect of the present invention, the center of curvature of the concave depression, the center of curvature of the Hindle sphere, and the closer focus of the mirror may be realigned until the step of sensing provides an indication of alignment.

According to a third aspect of the present invention, a grazing, convex, hyperbolic, secondary mirror may be aligned with respect to a parabolic primary mirror by the steps of aligning a center of curvature of a concave depression in a truncated apex end of the secondary mirror so as to be coincident with a focus of the secondary mirror that is closer to the mirror than its conjugate, and aligning the coincident center of curvature of the depression and the closer focus of the mirror to be coincident with a focus of the primary mirror.

In further accord with the third aspect of the present invention, a point source may be provided at the coincident center of curvature of the depression, closer focus of the mirror and focus of the primary mirror, an optical flat may be provided normal to an axis of the primary mirror, and the primary and secondary mirrors may be aligned so as to cause a return image from the optical flat and a return image from the depression to be coincident.

According to a fourth aspect of the present invention, an article of manufacture comprises a convex, hyperbolic mirror having a concave depression in a truncated apex end of the mirror.

In further accord with the fourth aspect of the present invention, the depression may be spherical.

In still further accord with the fourth aspect of the present invention, the depression may form a concave mirror.

Still further in accord with the fourth aspect of the present invention, the hyperbolic mirror may have a second concave depression in another end of the mirror.

In accordance with a fifth aspect of the present invention, an apparatus for mounting a convex hyperbolic mirror comprises a base having opposed mounting arms with gas passages therein, and a pair of opposed tooling balls mounted on the opposed mounting arms and having gas passages therein for connection to the gas passages in the mounting arms, wherein the tooling balls are for insertion in concave depressions in opposite ends of the mirror and wherein gas bearings between the mirror depressions and the tooling balls may be formed by forcing gas into the passages in the mounting arms.

In further accord with the fifth aspect of the present invention, the apparatus for mounting a convex hyperbolic mirror may further comprise means for rotating the mirror. Such may include a pulley for temporary attachment to the mirror and a motor and belt arrangement for attachment to the pulley.

The definition of the conjugate allows the mirror to be positioned within a Hindle Test Stand at the precise axial position for each of many tests, and then allow the mirror to be positioned in the desired position in the optical system such as a telescope.

This invention may be used in producing any secondary mirror for Wolter Type II Grazing Incidence telescopes for X-ray or UV portions of the spectrum.

This invention may be used to test grazing incidence, convex, hyperbolic mirrors used in systems imaging X-ray and ultraviolet "light".

These and other objects, features and advantages of the present invention will become more apparent in light of the following detailed description of a best mode embodiment thereof, as illustrated in the accompanying drawing.

BRIEF DESCRIPTION OF THE DRAWING

The drawing, not drawn to scale, includes.

DETAILED DESCRIPTION OF THE INVENTION

Figure 1:
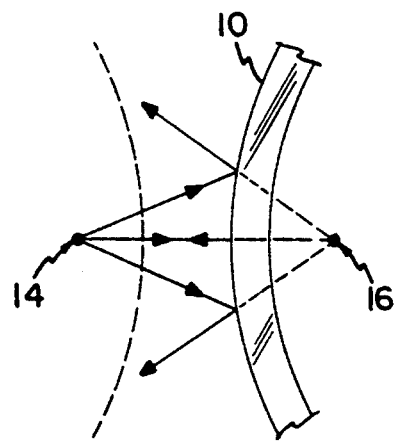
FIG. 1 illustrates a prior art convex, hyperbolic mirror having first and second conjugate foci.
Figure 2:
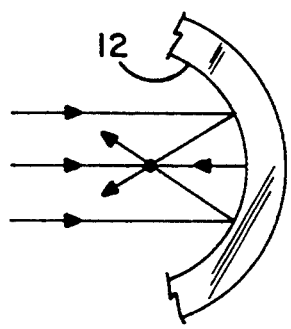
FIG. 2 illustrates a prior art parabolic mirror.

FIG. 1 and FIG. 2 show known aspheric mirrors, FIG. 1 showing a convex, hyperbolic mirror 10 and FIG. 2 a concave, parabolic mirror 12. Rays in FIGS. 1 & 2 appear to diverge or converge from or toward axial points which are the geometrical foci of the curved surfaces.

The hyperbolic mirror 10 of FIG. 1 has a first focus 14 and a second focus 16 having a selected relationship. A point source of light at the first focus will appear as if at the second focus. The parabolic mirror 12 of FIG. 2 will reflect an incident plane wave into a perfectly converging spherical wave, as suggested by the ray diagram.

Figure 3:
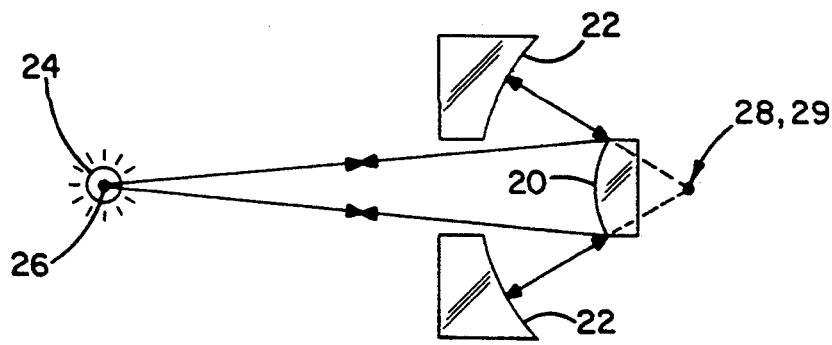
FIG. 3 shows testing of a convex, hyperbolic mirror using a Hindle sphere, according to the prior art.

FIG. 3 shows testing of a convex hyperbolic mirror 20 using a concave, spherical mirror 22 and a point source 24 at the first, conjugate focus 26 of a hyperbola defined by the convex surface of the mirror 20. This test was suggested by Hindle and has been in common use for a number of years. The center 28 of curvature of the concave spherical mirror (Hindle Sphere) 22 is placed at the second, conjugate focus 29 of the hyperbola. The combination of the two mirrors produces an image of the point source back upon itself. The image can be analyzed using a variety of techniques, including interferometry, and a knife edge in the manner suggested by Foucault.

Figure 4:
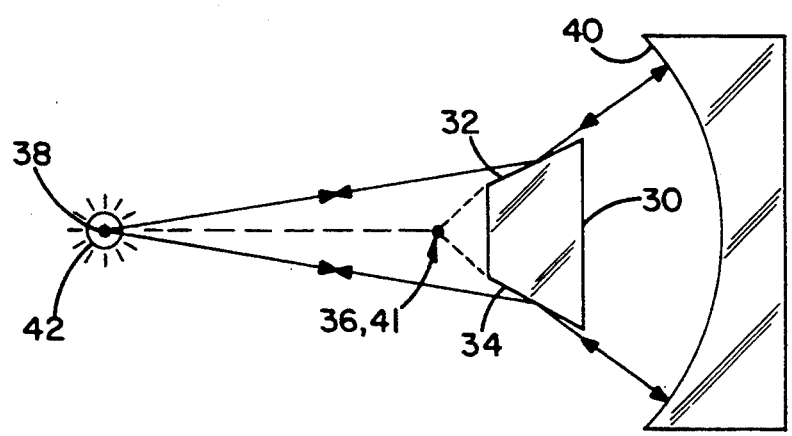
FIG. 4 shows a prior art test for testing grazing incidence, convex, hyperbolic mirrors with a Hindle sphere, according to the prior art.

As shown in FIG. 4, this test can also be used to test grazing incidence, convex, hyperbolic mirrors used, for example, in X-ray and ultraviolet "light" imaging systems. Here, a mirror 30 has a surface 32 and a surface 34 which together form parts of a truncated hyperbola having a second focus 36 and a first focus 38. An apex portion (not shown) of the hyperbola is cut off of the mirror. A spherical mirror 40 has its center of curvature 41 placed coincident with the second focus 36 of the hyperbola. As in FIG. 3, a point source 42 is placed at the first focus 38.

Although particular test arrangements are shown in FIGS. 3 and 4, it will be realized in general that, to test the hyperbola, the Hindle sphere and the hyperbola must be positioned so that one conjugate of the hyperbola is coincident with the center of curvature of the Hindle sphere.

Figure 5:
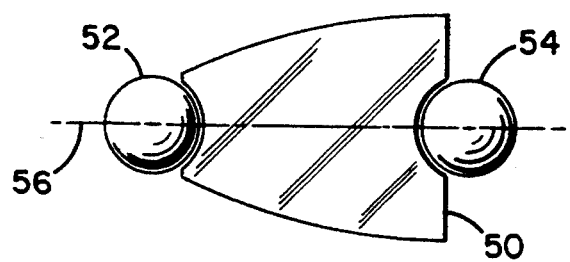
FIG. 5 shows a grazing incidence, convex, hyperbolic mirror having depressions, according to the present invention, and shown in one embodiment mounted between fixed tooling balls for rotation therebetween during fabrication or testing.

An approach for fabricating a grazing incidence, convex hyperbolic mirror, according to the invention, teaches that concave depressions be formed or ground and may be polished in each end of the hyperbolic mirror. As shown in FIG. 5, a convex, hyperbolic mirror 50 with concave depressions is then mounted between fixed tooling balls 52, 54 so that the centers of curvature of the depressions define an axis of rotation 56. The mirror may then be rotated between the centers.

Figure 6:
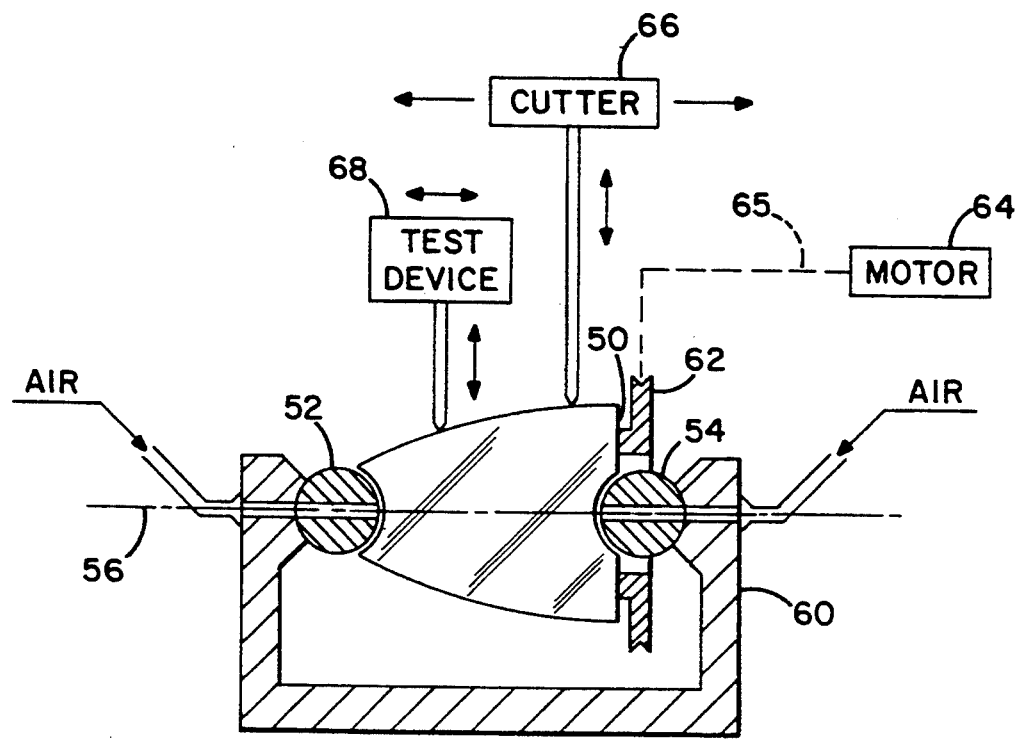
FIG. 6 shows another embodiment of the invention with gas bearings between the depressions and the tooling balls.

As shown in FIG. 6, the fixed tooling balls 52, 54 are shown mounted on arms of a machine base 60. Small holes may be drilled through the base 60 and through the two balls along the mirror axis 56. Air under slight pressure supplied through the two holes produces a gas bearing at each ball-mirror interface, allowing the mirror to be rotated very precisely on its axis. This property may be used to machine the mirror to the required aspheric shape and to inspect the mirror for roundness throughout the fabrication process. A pulley 62 or similar device to rotate the mirror may be temporarily "waxed" or otherwise adhered to the mirror 50. A motor 64 and belt 65 may be used to turn the pulley. A cutting tool 66 may be used to machine the surface of the mirror 50. A test device 68 measures the shape of the surface of the mirror.

Figure 7:
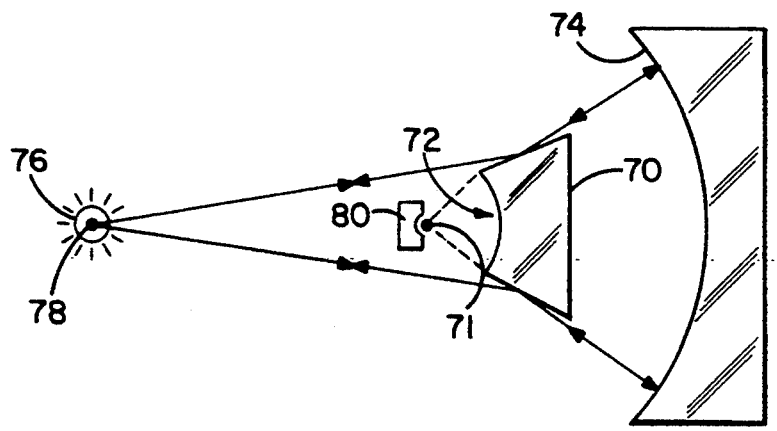
FIG. 7 shows, according to the present invention, a method for aligning a grazing, convex, hyperbolic mirror to a Hindle sphere.
Figure 8:
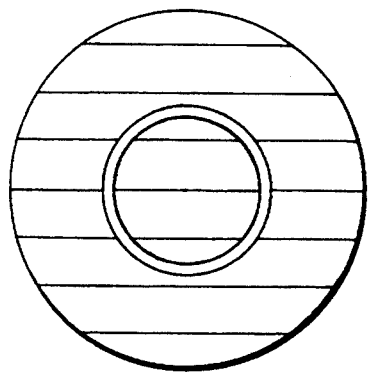
FIG. 8 shows the interferometer of FIG. 7 indicating alignment between the hyperbolic mirror and the Hindle sphere.
Figure 9:
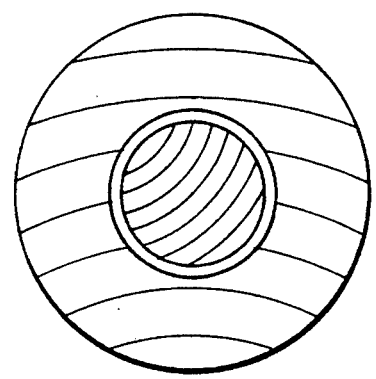
FIG. 9 shows misalignment between the hyperbolic mirror and Hindle sphere of FIG. 7.

According to another teaching of the present invention, if a mirror 70 is dimensioned and fabricated (ground and polished), as shown in FIG. 7, so that the center of curvature 71 of a polished spherical depression 72 is coincident with the shorter of the two conjugates of the hyperbola formed by the mirror surface, this depression 72 can be used to align the hyperbola to a Hindle sphere 74. Note that the Hindle sphere does not have an optical axis and the hyperbola need only be "pointed" roughly toward the center of the Hindle Sphere. Only vignetting will occur as the result of any incorrect alignment. A point source 76 is placed at the longer focus 78 of the two conjugates of the hyperbola. The secondary mirror 70 can be positioned with respect to the Hindle sphere by positioning an interferometer 80 with its focus coincident with the centers of curvatures of the dimple 72 and the Hindle sphere 74. Misalignment can then be determined using the resulting interferogram. FIG. 8 illustrates a case of alignment, and FIG. 9 illustrates misalignment.

Figure 10:
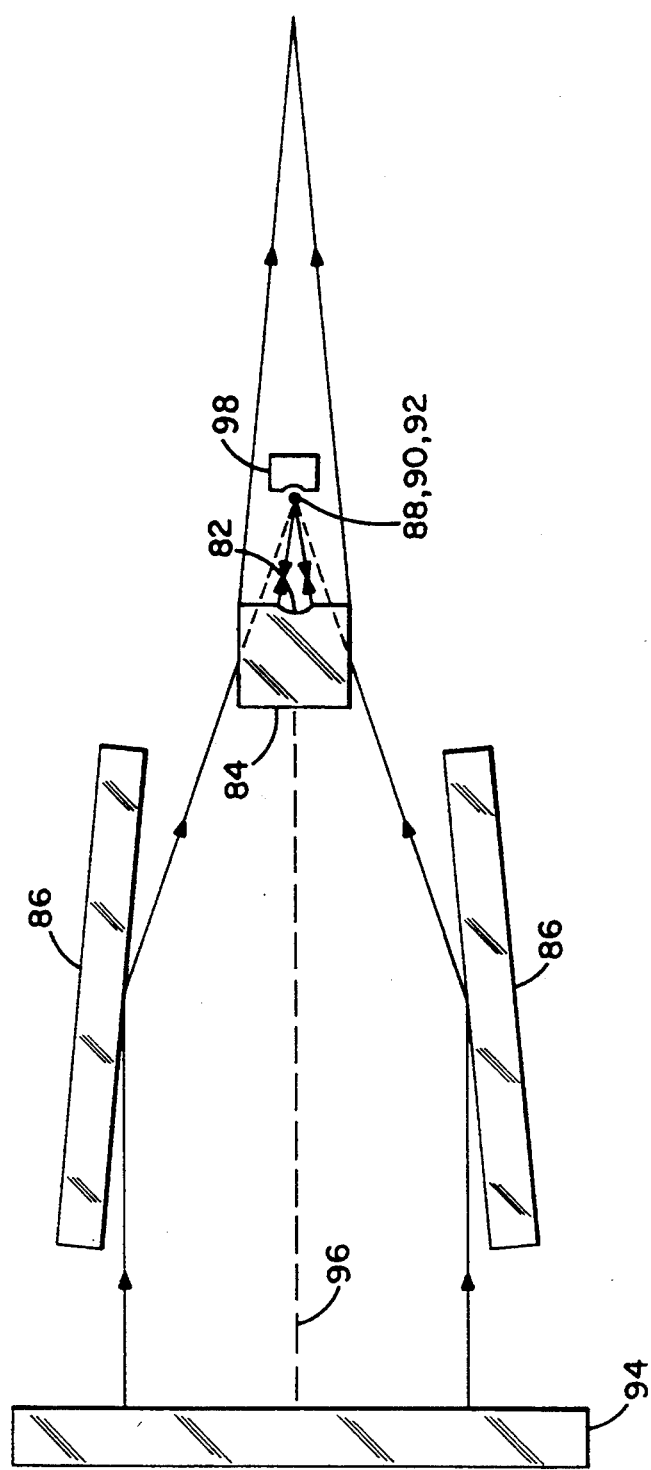
FIG. 10 shows, according to the present invention, how the dimple on the secondary, hyperbolic mirror can be used to position the secondary with respect to a primary mirror for system assembly and alignment.

As shown in FIG. 10, a dimple 82 on a grazing, convex, hyperbolic secondary mirror 84 can also be used to position the secondary with respect to a parabolic primary mirror 86 for purposes of system assembly or alignment. When properly positioned, a focus 88 of the primary mirror 86 and the center of curvature 90 of the dimple 82 in the secondary 84 are coincident. This property may be exploited in a number of ways. One such way is to set the primary up in auto-collimation with a point source 92 at its focus 88 and an optic flat 94 normal to its axis 96. System alignment is achieved when the return image from the primary and the return image from the dimple are coincident. Again, an interferometer 98 may be used to judge alignment.

Although the invention has been shown and described with respect to an exemplary embodiment thereof, it should be understood by those skilled in the art that the foregoing and various other changes, omissions and additions in the form and detail thereof may be made therein without departing from the spirit and scope of the invention.

What is claimed is:

1. An apparatus comprising:
    a convex, hyperbolic mirror having a first concave depression in a truncated apex end of the mirror, and a second concave depression in another opposing end of the mirror; and
    means for mounting the mirror between fixed points coincident with centers of curvature of the depressions; and
    means for rotating said mirror about an axis defined by said centers of curvature.

2. The apparatus of claim 1, wherein the depression is spherical.

3. The apparatus of claim 1, wherein the depression is polished to form a concave mirror.

4. Apparatus for mounting a convex hyperbolic mirror, comprising:
    a base having opposed mounting arms with gas passages therein; and
    a pair of opposed tooling balls mounted on the opposed mounting arms and having gas passages therein for connection to the gas passages in the mounting arms, wherein the tooling balls are for insertion in concave depressions in opposite ends of the mirror and wherein gas bearings between the mirror depressions and the tooling balls may be formed by forcing gas into the passages in the mounting arms.

5. The apparatus of claim 4, further comprising means for rotating the mirror.

6. The apparatus of claim 5, wherein the means for rotating comprises a pulley for attachment to the mirror.

7. The apparatus of claim 6, wherein the means for rotating further comprises a motor and belt arrangement for attachment to the pulley.

8. A method of positioning a grazing, convex, hyperbolic mirror with respect to an axis of rotation thereof, comprising the steps of:
    forming concave depressions in opposite ends of the mirror; and
    mounting the mirror between fixed points coincident with centers of curvature of the depressions and defining the axis of rotation.

9. The method of claim 8, further comprising the steps of:
    rotating the mirror about the axis of rotation; and
    machining the mirror into a selected hyperbolic shape such that the axis of rotation is coincident with a major axis of the selected hyperbolic shape.

10. The method of claim 8, further comprising the steps of:
    rotating the mirror about the axis of rotation; and
    testing the shape of the mirror for a selected hyperbolic shape.

11. The method of claim 8, wherein the fixed points are tooling balls and further comprising the step of providing gas bearings between the depressions and the tooling balls.

12. The method of claim 11, wherein the gas bearings are provided by forcing gas through passages in the tooling balls.

13. The method of claim 8, wherein one of the concave depressions has its center of curvature coincident with a focus of the mirror that is closer to the mirror than its conjugate.

14. A method of aligning a grazing, convex, hyperbolic mirror with respect to a Hindle sphere, comprising the steps of aligning a center of curvature of a concave depression in a truncated apex end of the mirror so as to be coincident with a focus of the mirror that is closer to the mirror than its conjugate and aligning the coincident center of curvature of the depression and the closer focus of the mirror to be coincident with a center of curvature of the Hindle sphere.

15. The method of claim 14, further comprising the steps of:
    providing a point source at a focus of the mirror that is further from the mirror than the closer focus; and
    sensing light at the coincident center of curvature of the Hindle sphere, center of curvature of the depression and closer focus of the mirror.

16. The method of claim 15, further comprising the step of realigning the center of curvature of the concave depression, the center of curvature of the Hindle sphere and the closer focus of the mirror until the step of sensing provides an indication of alignment.

17. A method of aligning a grazing, convex, hyperbolic, secondary mirror with respect to a parabolic primary mirror, comprising the steps of:
    aligning a center of curvature of a concave depression in a truncated apex end of the secondary mirror so as to be coincident with a focus of the secondary mirror that is closer to the mirror than its conjugate; and
    aligning the coincident center of curvature of the depression and the closer focus of the mirror to be coincident with a focus of the primary mirror.

18. The method of claim 17 further comprising the steps of:
    providing a point source at the coincident center of curvature of the depression, the closer focus of the mirror and focus of the primary mirror;
    providing an optical flat normal to an axis of the primary mirror; and
    aligning the primary and secondary mirrors so as to cause a return image from the optical flat and a return image from the depression are coincident.

* * * * *